United States Patent [19]

George et al.

[11] Patent Number: 4,659,610

[45] Date of Patent: Apr. 21, 1987

[54] STRUCTURES MADE USING AN INORGANIC-BINDER COMPOSITION

[75] Inventors: Stephen George; Thomas H. George, both of Clinton, N.J.

[73] Assignee: Subtex, Inc., New York, N.Y.

[21] Appl. No.: 851,284

[22] Filed: Apr. 10, 1986

Related U.S. Application Data

[63] Continuation of Ser. No. 598,864, Apr. 11, 1984, abandoned, which is a continuation-in-part of Ser. No. 585,909, Mar. 2, 1984, Pat. No. 5,507,355.

[51] Int. Cl.$^4$ .................... B32B 27/14; C04B 35/02; D02G 3/00; D04H 1/58
[52] U.S. Cl. .................................. 428/198; 428/261; 428/288; 428/289; 428/357; 428/366; 428/367; 428/375; 428/379; 428/392; 428/393; 428/394; 428/395; 501/95

[58] Field of Search ............... 428/283, 288, 289, 261, 428/246, 375, 378, 372, 198, 292, 357; 501/95

[56] References Cited

U.S. PATENT DOCUMENTS

| | | | |
|---|---|---|---|
| 4,358,500 | 11/1982 | George et al. | 428/246 |
| 4,375,493 | 3/1983 | George et al. | 428/246 |
| 4,396,661 | 8/1983 | George et al. | 428/246 |

Primary Examiner—Lorraine T. Kendell
Attorney, Agent, or Firm—Scully, Scott, Murphy & Presser

[57] ABSTRACT

An inorganic binder composition is employed in combination with fillers comprising particulates, fibers, filaments or yarn to form a structure. The coating is prepared from colloidal silica, monoaluminum phosphate, aluminum chlorohydrate an organo tin catalyst and optionally a refractory material.

9 Claims, No Drawings

STRUCTURES MADE USING AN INORGANIC-BINDER COMPOSITION

This application is a continuation of application Ser. No. 598,864, filed Apr. 11, 1984, now abandoned, which in turn is a continuation-in-part of application Ser. No. 585,909, filed Mar. 2, 1984, now U.S. Pat. No. 5,507,355.

BACKGROUND OF THE INVENTION

1. Field of the Invention

This invention relates to structures comprising either a composite or a material. The composite is made from a filler comprising particulate matter or fibers, filaments or yarn in combination with an inorganic binder composition optionally containing refractory materials. For the purpose of the present invention non-woven fabrics manufactured using the inorganic binder composition as a binder (versus a surface coating) will be classified as composites. The inorganic binder composition may be present in a small amount but sufficient to bind the filler material to itself, the inorganic binder composition also being present up to an amount sufficient to act as a matrix for the filler. The inorganic binder composition in this respect may comprise from 1 to 99% by weight of the structure on a dry weight basis. The composite is then formed by shaping, either with or without pressure, after which water is removed from the inorganic binder composition and the binder is cured. The inorganic binder composition imparts flame, heat and high temperature resistance to the composite.

This invention also relates to inorganic binder composition coated filaments, fibers or yarn and a structure comprising materials made therefrom. Materials for the purpose of this invention include fabrics whether woven or knitted and braided, cordage or roving and any material made from fibers or filaments such as yarn. Non-woven fabrics that we held together mechanically e.g. needle punched fabrics will be classified as materials for the purpose of the present invention. More particularly, the present invention relates to filaments, fibers or yarn having a coating of an inorganic binder compostion and, optionally, refractory materials formed thereon and materials made therefrom. This invention especially relates to filaments, fibers or yarns of natural or synthetic materials or mixtures thereof having formed thereon a coating of an inorganic binder composition optionally containing refractory materials after which water is removed from the binder and the binder is cured. The coating imparts flame, heat, and high temperature resistance to the fibers, filaments or yarn and the materials made therefrom.

In making the materials, the fibers, filaments or yarn are first coated with the inorganic binder composition and then formed into a material. The structure comprising the composite is distinguished from the structure comprising the materials of this invention in that the composite is formed by adhesively binding fillers e.g. particulate matter or fibers, filaments or yarn to one another and the material is made from completely coated fibers, filaments or yarns that have the inorganic binder composition applied and cured first and then are formed into a material without the inorganic binder composition being employed to adhere the fibers, filaments or yarns to one another. The completely coated fibers, filaments, or yarns, however, can be made into a composite whereby at least two refractory binder coatings are applied; at least one to envelop the fiber, filament, or yarn and at least one to bond the fiber, filament or yarn to one another.

2. Description of the Prior Art

Ceramics and/or glass fibers have been used herebefore to prepare high temperature electrical insulating tape. U.S. Pat. No. 4,358,500 discloses refractory coated insulating compositions wherein the refractory coating, comprising refractory materials and an inorganic bonding agent, is formed on the surface and, necessarily, the interstices of a porous base fabric, such as a knitted fiberglass fabric. In the presence of extreme temperatures and heat, the refractory materials fuse into the softened surface of the base fabric, enabling it to withstand intense heat, flame impingement, flame abrasion and elevated temperatures well beyond the normal temperature limitations of the fabric. The resulting fabric structure will have ceramic qualities and will not soften, melt, drip or lose its insultating properties.

Commonly assigned U.S. Pat. Nos. 4,375,493, 4,429,999 and 4,396,661 relate to multi-functional fabric compositions having a refractory coating on one side of the base fabric and a different coating providing a different function on the other side, i.e., the '999 patent—a vapor barrier coating, the '493 patent—a conductive coating and the '661 patent—a dielectric coating.

The inorganic bonding agent disclosed in U.S. Pat. No. 4,358,500 is prepared from colloidal silica, monoaluminum phosphate (MAP) and aluminium chlorohydrate (ACH) by adding the MAP and ACH separately to the colloidal silica which acts as a liquid moderator. Although the compositions containing the inorganic bonding agent of U.S. Pat. No. 4,358,500 may be exposed to high temperatures, no products of combustion in the form of smoke or fumes are produced as with other prior art coated fabrics. Further, the refractory coated compositions prepared with the inorganic bonding agent proved superior to inorganic coatings available for use on fabrics or paper substrates. The latter inorganic coatings could be damaged by water. They could be wet by water and the water could solvate the coating to the point of causing the inorganic coating to dissociate itself from the substrate. Although other binders, such as the acrylics, inhibited this wetting action, they would burn off when subjected to flame and high temperature. The refractory coated substrates disclosed in the '500 patent, on the other hand, are not wetted by water and are not subject to the solvation action of water as are other inorganic coatings. However, despite these advantages, the refractory coated compositions of the '500 patent exhibit a very undesirable feature. This refractory coating must be applied to a porous fabric so that the coating will be placed in the interstices of the fabric. This is necessary to achieve the formation of the refractory coating on this fabric. However, this requires the use of a larger quantity of the refractory coating when preparing these compositions to the extent that the coating in many instances constitutes about 50% of the overall weight of the impregnated base fabric. The result of all this is that when this coated fabric is flexed, the bond of the refractory coating to the substrate is disrupted and some particles may be released to the surface resulting in "dusting" of the coating. This, of course, is highly undesirable despite the very desirable features of flame and high temperature resistance which are exhibited by these refractory coated compositions.

Additionally, when fabrics, whether woven, knitted or nonwoven are impregnated with a coating such as a inorganic binder composition, the intersection of the fibers, filaments or yarns from which the fabrics are made, may not receive any coating or only a minimal amount of coating and as such comprise points or areas on the fibers, filaments or yarn where heat degredation and other degredation of the fabric can be initiated.

In addition to their use as insulating tape for electrical wires and cables, these materials were attempted to be employed as high temperature gas filters. Since the inorganic binder composition is formed on the porous knitted or woven fabric, the size of the individual openings is difficult to control with any degree of precision and attempts to achieve this control have not been successful.

Natural and synthetic fibrous materials are employed in such composites (as that term is defined herein) as paper, thermal insulation and the like where the fibrous materials are provided in short lengths or continuous filaments disposed in a random or regular fashion. Binders (also known as bonding agents) of various types are often employed to retain the materials in a fixed position and, in some instances, to provide a certain degree of rigidity (mechanical integrity) to the composition. Fiber glass and mineral wool insulation in the form of batts, blankets or pipe insulation are examples of these products. Asbestos and glass fiber papers for electrical insulation are other examples. Wood particle molded roof shingles are another. Woven fabrics made from natural fibers or synthetic organic fibers optionally containing an organic coating are examples of materials of this type (as that term is defined herein). Various resins, polymers and/or other organic compounds are employed as binders in these structures. Acrylic resins are often employed in asbestos and glass paper while formaldehyde type resins (e.g. urea-formaldehyde and phenol formaldehyde resins) are used to prepare semi-rigid pipe insulation of fiberglass. Exposure of these composites or materials to extremely high temperatures can cause the binder or filler, e.g. fiber or particulate, to decompose producing smoke and fumes which may prove harmful to persons in the vicinity. In other circumstances, the binder may produce flames upon exposure to such high temperatures causing a potentially dangerous situation.

It is therefore an object of this invention to provide a novel composition of matter and structure comprising a composite or material employing a inorganic binder composition, optionally containing a refractory material.

It is also an object of this invention to provide a novel composition of matter comprising a filler, and an inorganic binder composition, and a novel composite made therefrom by forming the filler and composition followed by drying the composition where the inorganic binder composition functions to bind the filler to itself or may act as a matrix for the filler.

It is also an object of this invention to provide fibers, fillers, or yarns that are completely enveloped in an inorganic binder composition.

It is an object of the invention to provide a material where the fiber, filament on yarn from which it is made is completely enveloped with an inorganic binder composition before the material is manufactured.

It is a further object of this invention to provide a novel composition comprising fibers, filaments or yarn coated with an inorganic binder composition.

It is an object of this invention to enable the manufacture of a high temperature resistant fabric having precisely controlled apertures.

It is an object of this invention to provide composites or materials, e.g. fabrics containing randomly or regularly oriented fibrous materials, which can be exposed to flame or high temperatures without the production of noxious fumes and/or flames that prior art composites or materials have produced heretofore.

It is an object of this invention to provide an improved fabric having an inorganic bonding agent (binder) composition which provides an intimate bond between the inorganic binder composition and the fibrous surface of the fabric so that the coating will not dissociate itself from the fabric by flexure of the coated composition.

It is another object of this invention to provide a fabric coated with an inorganic binder composition which will not exhibit "dusting" of the inorganic binder composition in use.

SUMMARY OF THE INVENTION

These and other objects of this invention have been achieved by preparing an inorganic binder composition from colloidal silica, monoaluminium phosphate, aluminum chlorohydrate and an organo tin catalyst such as an organic tin halide catalyst. This composition is optionally combined with refractory material and applied to fillers, such as particulate matter, fibers, filaments or yarn to provide novel compositions. The structures made therefrom have flame and high temperature resistance. This composition is an improvement over the bonding agent disclosed in U.S. Pat. No. 4,358,500 and leads to the use of substantially lower amounts of refractory-binder coating while providing the same water shedding properties and the same flame and fire protection as the refractory coated compositions disclosed therein.

The present invention specifically relates to a heat resistant structure comprising:
(a) A filler selected from at least one member of the group consisting of particulate matter, fibers, filaments or a yarn;
(b) An inorganic binder composition comprising colloidal silica, monoaluminum phosphate, an organo tin catalyst and aluminium chlorohydrate,
  (i) Said structure comprising a composite where said composition is present in a range from a minimal amount to substantially bind said fillers to one another up to a maximum amount to form a matrix around said fillers;
  (ii) Said structure comprising a material of said fibers, filaments or yarn in which said composition does not bind said fibers, filaments or yarns to one another where said composition is present in an amount to substantially coat the entire surface of said fibers, filaments or yarn to form a continuous coating thereon.

This invention also specifically relates to a method of preparing a structure which comprises the steps of:
(a) Combining a filler selected from at least one member of the group consisting of particulate matter, fibers, filament or yarn with an inorganic binder composition comprising colloidal silica, monoaluminum phosphate, aluminum chlorohydrate, an organo tin catalyst and water to obtain a composite;
(b) Forming said composite and optionally applying pressure to said formed composite;
(c) Curing the inorganic binder composition;

This invention also relates to a composition of matter comprising the inorganic binder composition and the filler.

The binder composition may optionally contain a refractory composition.

DESCRIPTION OF THE PREFERRED EMBODIMENTS

The present invention is an improvement over composites made according to prior art methods in which organic binders were employed which were heat sensitive i.e. they could be degraded or decomposed by heat. The inorganic binder composition of the present invention is a heat and flame resistant refractory material that allows the composites to be used in environments that previously excluded the use of heat sensitive materials. The composites employing the inorganic binder composition are also improvements over the previous inorganic binder using water glass, (sodium silicate) as a base since the coatings obtained by the present invention are not subject to rehydration as in the case of water glass systems.

The present invention is an improvement of the heat resistant, flexible, refractory insulating fabric compositions of U.S. Pat. No. 4,358,500 and U.S. patent application Ser. No. 585,909 filed Mar. 2, 1984; the entire contents of both are incorporated herein by reference.

Briefly, the coated yarns of the present invention differ from those of the above patent in several respects. The coating formed on the yarn in this invention is a continuous layer which coats the entire outside surface of the individual strand of yarn. In the compositions of U.S. Pat. No. 4,358,500, the yarn has been formed into a fabric before the inorganic binder composition is formed thereon so that where the yarn contacts other strands of yarn the entire outside surface of each strand of yarn is not coated.

The materials of the present invention and the method of producing such materials avoid this by coating the fibers, filaments, or yarn prior to their being formed into a fabric, rope, braiding, etc. This is especially advantageous in producing a heat resistant material from organic fibers, filaments or yarns since the coating substantially completely envelops the more heat sensitive organic materials and substantially decreases the opportunity for initiation of heat or flame degradation of the organic material. The same advantage also obtains for some inorganic fibers, filaments or yarn in that they are substantially completely enveloped in a inorganic binder composition before being formed into a material according to the present invention and as such are more refractory and heat resistant than such fibers, filaments or yarn in their uncoated state.

The inorganic binder composition of this invention is liquid and is prepared from three components, colloidal silica, monoaluminum phosphate and aluminum chlorohydrate. The latter two materials cannot normally be employed in combination since when they are combined the result is highly exothermic, producing a solid material which becomes adhesive. By employing the collodial silica, which acts as a liquid moderator, the monoaluminum phosphate (MAP) and the aluminum chlorohydrate (ACH) may be used in combination to achieve the desired results.

In addition to these three components the inorganic binder composition of the invention contains a catalyst which promotes the curing of the binder when it is applied to an appropriate surface and increases the bond between this surface and the binder composition. The preferred catalyst is an organo-metallic compound e.g. an organo-tin compound, specifically, a lower alkyl tin halide. The alkyl tin halide catalyst is preferably a trialkyl tin chloride, most preferably, a tri-butyl tin chloride and especially, triisobutyl tin chloride. A particularly preferred catalyst which may be employed in the binder of this invention is a product of Dow Corning Corporation, Midland, Mich. known as Dow Corning catalyst 182A, wherein the active ingredient is triisobutyl tin chloride.

When practicing this invention the inorganic binder composition which is applied to the appropriate surface optionally comprises at least one of the heat resistant refractory materials or any combination thereof intermixed or dispersed in the binder. For the purpose of this invention, the fillers as defined herein do not include the refractory materials or the silica of the inorganic binder composition. The refractory materials may be any of the usual known refractory materials in finely divided form and include compounds of aluminum, calcium, carbon, chromium, graphite, magnesium, silicon, titanium, zirconium and the like, such as aluminum oxide, calcium oxide, magnesium oxide, alumina silica, thermal carbon, black silicon carbide, zirconium carbide and the like alone or in any combination. Two, three and four component mixtures are preferred where mixtures are used. Alumina, zirconia, carbon, graphite, calcium silicate, molybdenum trioxide and silicon dioxide are preferred. These materials enable the compositions of this invention to maintain their heat insulating ability after prolonged exposure to temperatures in excess of 2200° F.

In formulating the inorganic composition employed in this invention, the quantities of the components may be varied over a considerable range. It is usually convenient to provide the monoaluminum phosphate and the aluminum chlorohydrate in a weight ratio of MAP to ACH of about 0.8:1.0 to about 1.5:1.0, preferably about 1.0:1.0 to about 1.25:1.0. The quantity of colloidal silica to be employed is based on the weight ratio of the liquid colloidal silica to the combined weights of the MAP and the ACH. A weight ratio range of colloidal silica to MAP plus ACH of about 0.6:1 to about 1:1, preferably about 0.75:1 to 0.85:1 has been found useful. The quantity of catalyst to be employed is based on the weight ratio of the liquid catalyst to the combined weights of the MAP, the ACH and the colloidal silica. A weight ratio range of catalyst to MAP, ACH and colloidal silica of about 0.025:1.0 to about 0.125:1.0, preferably about 0.06:1 to about 0.08:1.0 has been found useful. Preferably, the binder composition should be applied as a coating in a dilute concentration by adding a quantity of water to the combined ingredients. A ratio of the combination of MAP, ACH and colloidal silica to water of about 0.05:1.0 to about 1.0:1.0 can be effectively employed. The water employed should be soft or at least deionized to achieve best results. Additional water may be used as a diluent for different coating techniques (e.g. spraying, dipping, etc.) without deleterious effects.

Since the catalyst promotes the reaction of components, the binder composition has a definite pot time, usually about 2 to about 3 or more hours. In general, the more water added to the mixture, the longer the pot time.

In preparing this inorganic binder, the required amounts of MAP and ACH are separately added to a suspension of colloidal silica. The refractory materials, the catalyst and the necessary amount of water are added to complete the formulation of the inorganic binder composition.

The inorganic binder composition is then applied to the filler to make the composite or it may be applied only to the filament, fiber or yarn which is subsequently manufactured into materials according to the present invention. The filler which may include the particulates fiber, filament or yarn is referred throughout the specification as the substrate to which the inorganic binder composition is applied.

This inorganic binder composition may be applied to the substrate and maintained at an elevated temperature for a period of time sufficient to cause removal of the water and permit the MAP and the ACH, in the presence of the catalyst, to react slowly producing a slowly thickening material which per se bonds to the surface or bonds the refractory materials to the surface of the substrate providing an adhesive to bind and/or coat the substrate giving flame and high temperature resistant properties to the substrate and providing an inorganic adhesive coating which is not water soluble.

When the inorganic binder composition has been bonded to the substrate, the resulting coating has an acid pH which should be neutralized or the chemical bonding action will continue slowly over a period of time causing the substrate to lose some degree of flexibility. This acidity may be neutralized by a dilute alkali solution of ammonia, caustic and the like. The solution may be sprayed onto the substrate and inorganic binder composition or the substrate and inorganic binder composition may be passed through a bath of the dilute alkali solution. Following the neutralization, it can be air dried or slowly dried in streams of warm air. Where loss of flexibility or an acid pH creates no particular problem, the neutralization step can be eliminated.

The neutralizing agent such as ammonia may be added to the inorganic binder composition prior to applying the composition to a substrate when the solids of the coating are from about 2 to about 10% and the water in the coating amounts to from about 90 to about 98% by weight.

The fillers, e.g. particulates, fiber, filaments or yarn, to which the inorganic binder composition is applied may be composed of a wide variety of materials. Basically, any non-ferous natural or synthetic material or mixtures thereof which can be formed into particulates or fiber, filament or yarn can have a inorganic binder composition formed on the outside surface of the filler by the practice of this invention. The only limitation being that the composition(s) in the fiber, filament or yarn and those of the inorganic binder composition must be compatible. Thus, such natural materials as cotton, silk, wool, asbestos, glass, mineral wool, and the like and such man-made materials as aramid, polyester, nylon and the like, and carbon, boron or other non-ferrous metal fibers alone or in combination, may be used.

Filaments for the purpose of this invention comprise substantially continuous monofilaments, whereas fibers comprise shorter filaments whether man-made or natural materials such as cotton, wool and the like. Yarns are made from filaments or fibers that are spun or twisted to form a substantially continuous strand of fibers or filaments.

The yarn may be in monofilament form e.g. fiberglass, or composed of a number of individual filaments or threads. The yarn is formed in a single opening die or a multiple opening die known as a spineret and then passed to the take-up spool.

The composites of the present invention are made by combining the inorganic binder composition of the present invention with a filler, the filler comprising a particulate material including without limitation inorganic particulate materials such as, sand, glass beads, fly ash, and the various art known equivalents thereof, as well as the organic particulate materials known in the art such as wood flour, saw dust, wood chips, organic resinous material, whether thermosetting or thermoplastic, such as thermosetting phenolic resin beads, or thermoplastic materials such as, polyvinylchloride, copolymers of polyvinlychloride such as the copolymers of polyvinylchloride and polyvinylacetate, polyethylene and the like. The fillers of the present invention, as noted herein, also comprise fibers such as the inorganic fibers and the organic fibers previously described herein and the naturally occurring fibers also described herein.

The composites are formed by applying the inorganic binder composition to the filler within a range of an amount of inorganic binder composition minimally necessary to bind the filler to itself to a maximum amount whereby the inorganic binder composition acts as a matrix surrounding the filler. The filler, which has the inorganic binder composition applied to it, is then formed by processes known in the art such as (1) shaping the composite in a mold before it is cured and optionally applying pressure and/or heat to the composite or (2) forming the composite into a web, removing the water therefrom, and optionally applying pressure thereto either by means of a platten press or pinch rollers such as in a calendering process, after which the inorganic binder composition is heat cured.

The following serves to illustrate the subject invention.

An inorganic binder composition usefully employed in this invention contains the following ingredients, listed in their order of addition:

TABLE I

| | Parts (By Weight) |
|---|---|
| Water | 16 |
| Colloidal Silica (Nyacol 2034 DI) (34% Solids) | 30 |
| Monoaluminum Phosphate (MAP) (42% Solids) | 20 |
| Aluminum Chlorohydrate (Cawoods-5025) (32% solids) | 20 |
| Catalyst (Dow Corning catalyst 182A) (21% solids) | 5 |
| Water | 48 |

The liquid inorganic composition is formed by slow addition of MAP to the mixture of about one-third parts by weight water and two-thirds parts by weight colloidal silica while mixing, followed by the slow addition of the ACH while mixing. Mixing should be continued while the catalyst is added and is continued until a slight increase in viscosity occurs and a smooth consistency is achieved, after which the remaining water and silica is added.

A high temperature inorganic binder composition may be formed by adding high temperature refractory materials to the liquid inorganic composition and mixing to a smooth consistency. Refractory materials, alone or in combination, for example, zirconium oxide, alumina-silica fiber, carbon fiber, zirconia fiber, graphite or thermal carbon black and the like, may be employed. One preferred inorganic binder composition comprises the above binder plus refractory materials of alumina-silica fiber and zirconium oxide. In forming this composition, the refractory materials are preferably added after the MAP but before the ACH. This preferred inorganic binder composition has the composition set forth in Table II where the ingredients are listed in the order of their addition. As prepared, this coating has a solids composition of 30.7%.

TABLE II

| | Parts (By Weight) |
|---|---|
| Water | 16 |
| Colloidal Silica (Nyacol 2034 DI) (34% Solids) | 30 |
| Monoaluminum Phosphate (MAP) (42% Solids) | 20 |
| Alumina Silica Fiber (Fiberfax) | 24 |
| Zirconium Oxide (Tam Zirox 250) | 8 |
| Aluminum Chlorohydrate (Cawoods-5025) (32% solids) | 20 |
| Catalyst (Dow Corning catalyst 182A) (21% solids) | 5 |
| Water | 48 |

The binder composition employed in this invention may be employed alone as a single bonding agent or binder or, alternatively, the binder may be employed in combination with any of the commercial binders, often organic, that are conventionally employed especially in preparing certain fiber, filament or yarn composites or materials. The relative amounts of conventional, i.e., dissimilar, binder and the inorganic binder composition of this invention will be dependent on factors, inter alia, such as compatibility of the two binders, and the mechanical integrity required for the service in which the composites or materials will be placed. For example, formaldehyde based resins, e.g. urea formaldehyde or phenol formaldehyde resins, or polyimide resins can be used in this respect.

Curing the inorganic composition, after it is applied to the substrate, may be achieved by any of a number of procedures. Substrate temperatures of about 250° F. are usually effective for curing, although lower or higher temperatures may be employed, where required. An infrared source of heat has been found effective. Equally useful is a stream of forced hot dry air. Passing the coated substrate through a heated drying oven in a continuous fashion is an effective drying technique where the composition is being prepared in a continuous operation. The water should be removed first and during the course of this, the curing is initiated and is effected within minutes after water removal is complete.

The completed, cured inorganic binder composition may impart a stiffness to the finished structure. Where this stiffness is undesired, it is possible to retain flexibility of the structure by neutralizing the pH of the composite or material with a dilute alkali solution or a water based emulsion of a silicone rubber immediately after the initial cure is effected.

The practice of the subject invention is illustrated in the following example.

The ingredients of the binder composition were those of Table I and the refractory material consisted of alumina-silica fiber. The inorganic binder composition had the composition shown in Table III, where the ingredients are listed in their order of addition.

TABLE III

| | Parts (By Weight) |
|---|---|
| Water | 32 |
| Colloidal Silica (Nyacol 2034 DI) (34% Solids) | 60 |
| Monoaluminum Phosphate (MAP) (42% Solids) | 40 |
| Alumina-Silica Fiber (Fiberfax) (Ball Milled) | 48 |
| Aluminum Chlorohydrate (Cawoods 5025) (32% Solids) | 40 |
| Catalyst (Dow Corning catalyst 182A) (21% Solids) | 10 |
| Water | 96 |
| TOTAL | 326 |

This composition, which did not contain any zirconium oxide employed in the composition of Table II, has a lesser heat resistance than that of Table II.

Water and colloidal silica were mixed together. While this mixture was continuously being mixed, the remaining ingredients were slowly added thereto. Each ingredient was thoroughly mixed into the mixture before the next ingredient was added. After the final addition of water, the mixing was continued until the inorganic mixture was homogenous and smooth.

A composite is made according to the present invention by mixing wood flour with each one of the inorganic binder composition of Tables I, II and III in an amount of 80 parts by weight of wood flour and 20 parts by weight of inorganic binder composition. The inorganic binder composition is present in a minimal amount so that the particles of wood flour have sufficient coating on them so that they bind to one another. By increasing the amount of inorganic binder composition utilizing the compositions of Tables I, II, and III to 50% by weight, the inorganic binder composition forms a matrix around the wood flour particles. Any range of inorganic binder composition in between the minimum amount required to adhere the wood flour particles together and the amount required to have the coating form a matrix around the wood flour particles will produce a composite having properties in between those of the two sets of examples given herein.

The composites as described herein above of wood flour and the inorganic binder compositions are thoroughly mixed, and placed in molds conforming in shape to a roof shingle. After the composites are formed as described herein, the water from the coating is removed at elevated temperatures and/or vacuum. The composite is then heated in order to cure the coating, after which a dilute ammonia solution may be sprayed onto the molded composite. These fully cured composites then can be used as roof shingles.

The inorganic binder composition of Table III is mixed in with a glass fiber paper furnish in an amount such that the inorganic binder composition comprises 5% by weight of the furnish. The furnish is then placed on a moving screen to form a glass paper web. The web then passes through a process designed to remove the water from the web to cure the inorganic binder composition and form a glass paper sheet having relatively high temperature and flame resistance. Ammonia may be optionally supplied to the combination of furnish and inorganic binder composition to reduce the acidity of the composite.

Uncoated fiberglass filaments are placed on a screen and positioned in the bottom of a shallow flat bottom tray and the above liquid inorganic mixture was poured over them. The mixture was worked into the surface of the glass fibers until all surfaces were thoroughly wetted. The screen was then removed from the tray and the wetted fibers placed on a flat surface. The wetted fibers were then placed under a set of infrared lamps until dry.

The product obtained comprised a structure with an inorganic binder composition which provided a slightly roughed surface to the cloth and exhibited an acid pH.

In accordance with the present invention, the inorganic binder composition of Table I, II or III may be conveniently applied to yarn filaments or fibers before they are passed to the take-up spool in a yarn forming process. As the yarn is formed it may be passed through a dip coat bath containing the inorganic binder composition, such as that described hereinbefore. This well-known procedure will coat the entire exterior surface of the yarn with the inorganic binder composition. As the coated yarn passes from the bath, it is passed over a roller which removes any excess amount of the inorganic binder composition. The wet coated yarn is then passed through a drying oven, as described above, to effect removal of water and cure the inorganic binder composition. The coated yarn is then converted into materials by conventional means, i.e. roping, weaving, knitting, needle punching, braiding, or twisting etc. and is formed into a material, all after the inorganic binder composition has completely cured.

By careful regulation of the weaving looms, it is possible by employing inorganic binder compostion coated yarn prepared in accordance with the present invention to prepare an open weave porous fabric where the apertures have specific and very precise dimensions. Fabric prepared in this manner can be employed as the filter medium for the controlled removal of particulate matter from high temperature gas streams. The inorganic binder composition on the yarn permits the fabric to be employed at temperature levels higher than the upper temperature limits of the uncoated yarn and to withstand the effects of certain chemicals.

By including appropriate inorganic pigments and dyes, the inorganic binder composition used in this invention can be employed as a vehicle to color the fibers, filaments or yarn. This will permit the preparation of solid-colored and/or patterned-colored materials for use in high temperature enviornments.

In another embodiment of this invention, by coating with the inorganic binder composition fibers, filaments or yarns made from different compositions, a material can be prepared which will combine the properties of both yarns. For example, fiberglass and Aramid fibers, filaments or yarn can each be coated with the inorganic binder composition by practicing the present invention. Materials prepared from these yarns will combine the properties of fiberglass and Aramid fibers, filaments, or yarn with the high temperature properties of the inorganic binder composition. Other useful combinations will only be limited by the ingenuity of the skilled artisan.

The composites may be used as pipe insulation, shingles, and heat and flame insullating panels whereas the materials may be used as high temperature gas filters, heat and flame insulating panels, rope, or braiding.

Although the invention has been described by reference to some embodiments it is not intended that the novel article of manufacture method and composition be limited thereby but that modifications thereof are intended to be included as falling within the broad spirit and scope of the foregoing disclosure and following claims.

What is claimed is:

1. As an article of manufacture, a heat and flame resistant structure comprising:
    (a) a filler selected from at least one member of the group consisting of particulate matter, fibers, filaments or yarn; and
    (b) an inorganic binder composition comprising colloidal silica, monoaluminum phosphate, aluminum chlorohydrate, and an alkyl tin halide catalyst;
    said structure comprising a composite where said inorganic binder composition is present in a range from a minimal amount to substantially bind said fillers to one another up to a maximum amount to form a matrix around said fillers and said catalyst is present in an amount effective to increase the bonding of said inorganic binder composition when applied to said fillers.

2. A structure according to claim 1 wherein the weight ratio of colloidal silica to monoaluminum phosphate plus aluminum chlorohydrate is about 0.6:1 to 1:1, the weight ratio of monoaluminum phosphate to aluminum chlorohydrate is about 0.8 to 1.0 to about 1.5 to 1.0 and the catalyst is about 0.025 to 1 to about 0.125 to 1 of combined weight of the colloidal silica, the monoaluminum phosphate and the aluminum chlorohydrate.

3. The structure of claim 1 wherein said inorganic binder composition further contains a refractory material.

4. A structure according to claim 1 wherein the fibers, filaments or yarn comprises cotton, silk, wool, glass, aramid, mineral wool or mixtures thereof.

5. A structure according to claim 1 wherein the fibers, filaments or yarn comprises fiberglass.

6. A structure according to claim 1 wherein the fibers, filaments or yarn comprises mineral wool.

7. A structure according to claim 3 wherein the refractory materials comprise alumina, zirconia, molybdenum oxide, calcium silicate, silicon dioxide, silicon carbide, alumina-silica, thermal carbon black or mixtures thereof.

8. A structure according to claim 1 wherein said particulates are selected from at least one member of the group consisting of wood, glass resin and sand particulates.

9. A structure according to claim 1 wherein said catalyst comprises tri-isobutyl tin chloride.

* * * * *